July 29, 1969  R. H. WEILAND  3,457,806
MECHANICAL POWER TRANSMISSION

Filed Dec. 7, 1966  2 Sheets-Sheet 2

INVENTOR.
RICHARD H. WEILAND

Robert B. Hughes
ATTORNEY

United States Patent Office 3,457,806
Patented July 29, 1969

3,457,806
MECHANICAL POWER TRANSMISSION
Richard H. Weiland, Seattle, Wash., assignor to The
Boeing Company, Seattle, Wash., a corporation of
Delaware
Filed Dec. 7, 1966, Ser. No. 599,960
Int. Cl. F16h 37/06; B64c 3/38
U.S. Cl. 74—675                                3 Claims

ABSTRACT OF THE DISCLOSURE

This is a mechanical power transmission, wherein there is a planetary system comprising a sun gear, planetary gears mounted in a planetary carrier, and a surrounding ring gear meshing with the planetary gears. There is a single power output connected to the planetary carrier, and there are three separate power inputs, one of which is connected to the sun gear and the other two of which are connected to the ring gear.

---

Figure 1:
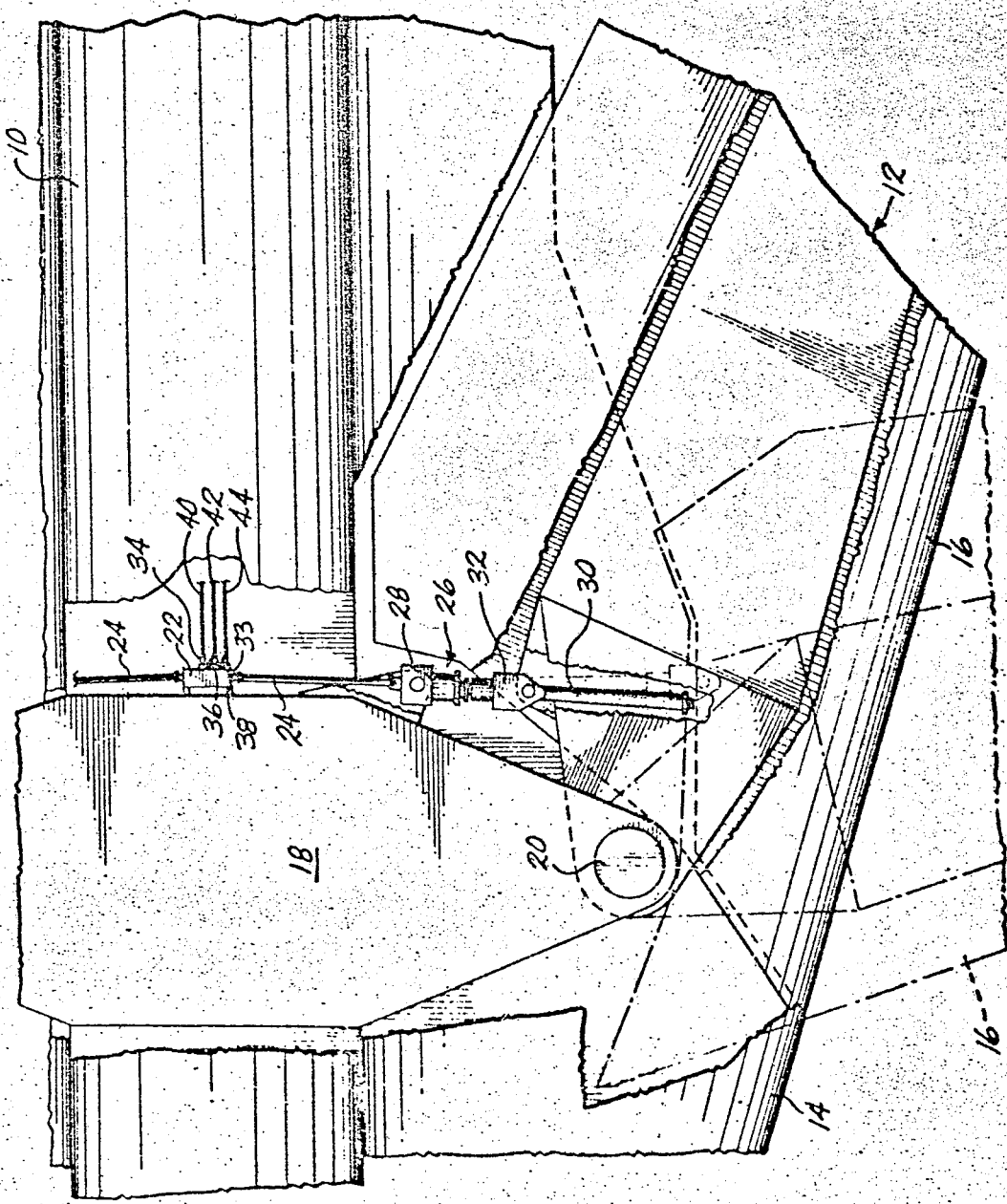

In the preferred embodiment of the present invention, there is a planetary gear system including a sun gear, a planetary carrier, a plurality of planet gears mounted to said carrier, and a ring gear engaging the planet gears. There is a single power output from the planetary carrier, while there are three power inputs: one for the sun gear, and two for the ring gear. With all three power inputs functioning, the output rotates at full speed and full torque. With any combination of two of the three power inputs functioning, the output rotates at two-thirds speed but at full torque, while any one power input functioning by itself will rotate the output at one-third speed but still at full torque.

The apparatus of the present invention was created to transmit power to move the wings of a variable-sweep wing aircraft (i.e., that type of aircraft in which the wings are swung to a rearwardly extending position for supersonic flight and are swung forward to a more laterally extending position for subsonic flight). Each of the three separate power inputs of the transmission is connected to a respective one of three different power systems on the aircraft, so that only the highly unlikely event of failure of all three power systems would make it not possible to move the wings. The failure (or deliberate nonuse) of one or two of the power systems only reduces the speed of movement of the wings by one-third or two-thirds, respectively, but the force transmitted to move the wings is not diminished.

While the above considerations are believed to be especially significant in the present invention, especially with regard to its above described application to a variable-sweep wing aircraft, there are other significant facets of the present invention. For example, by properly selecting the relative sizes of certain operating parts of the apparatus, the relative magnitude of the velocity components contributed by the three power inputs can be made to be different, so that by properly selecting the power inputs to be operated, a number of velocity outputs greater than the number of power inputs can be achieved.

In view of the foregoing, it is a general object of the present invention to provide a mechanical power transmission wherein there is a power output and at least three power inputs, each of the latter of which can function individually or in combination with one or more of the other power inputs to impart a given velocity component to the power output.

It is a further object to provide such a transmission which can be so arranged that any one of said power inputs operating individually can deliver full torque to the output.

Ancillary to the above object is that of providing a highly reliable power transmission for use in conjunction with a system having a plurality of power sources, whereby any single one or any combination of the power sources can operate the transmission at full torque output.

It is yet another object to provide a transmission so arranged that by selectively operating various combinations of power inputs, each of which contributes a velocity component of a magnitude differing from the other, a number of different output velocities, greater than the number of power inputs, can be achieved.

Figure 2:
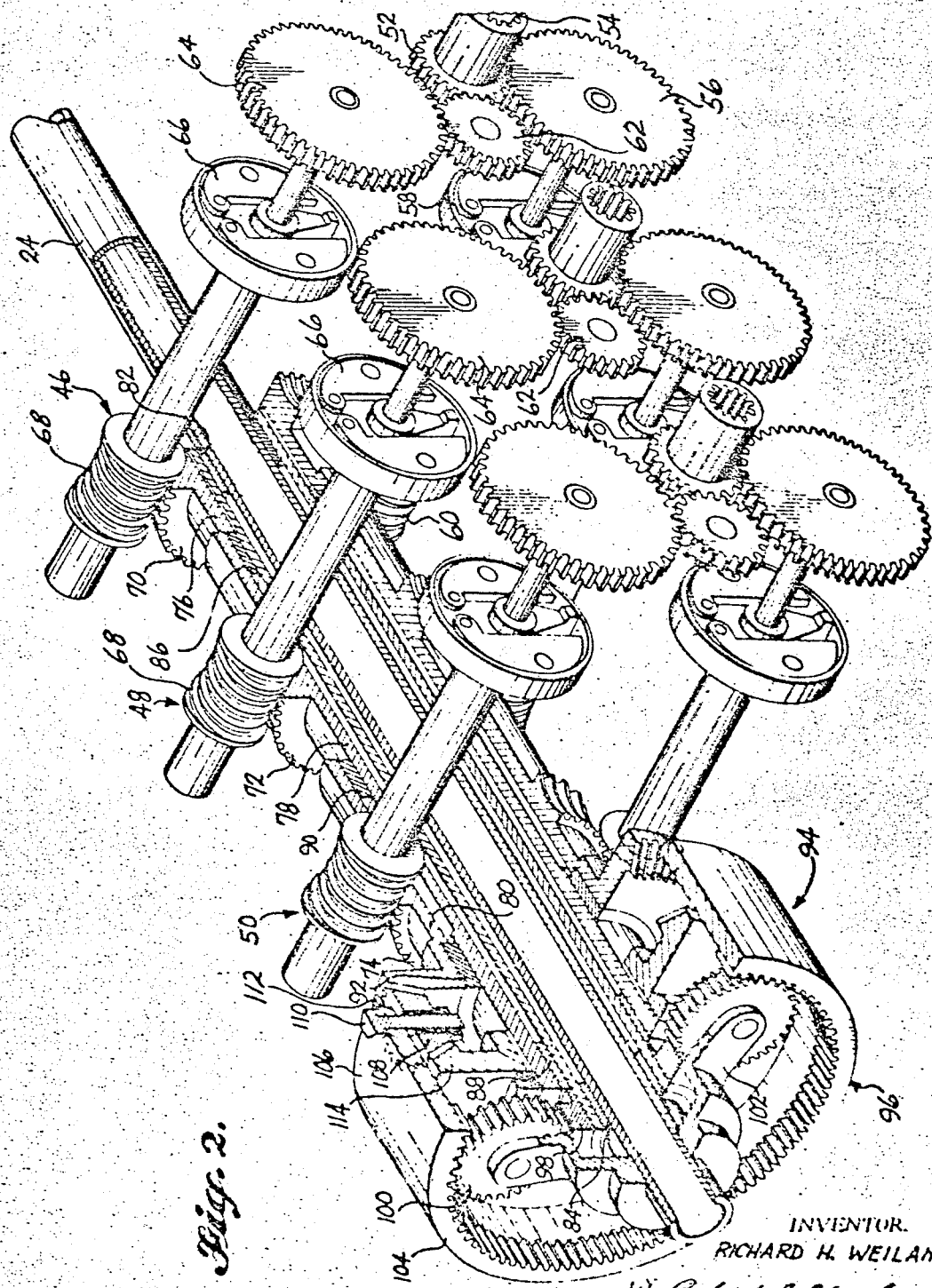

These and other objects and features of the invention will be more readily understood and appreciated from the following detailed description of the preferred embodiment thereof selected for purposes of illustration and shown in the accompanying drawings, in which:

FIGURE 1 is a plan view showing the transmission of the present invention installed in a variable-sweep wing aircraft, and FIGURE 2 is an isometric view of said transmission.

In FIGURE 1 there is shown a portion of a variable-sweep wing airplane, having a fuselage 10 and a pair of wings, the left one of which is shown at 12, each of said wings having a stationary forward portion 14 and a variable-sweep rear portion 16. Extending transversely of the fuselage 10 is a yoke 18, to which each of the variable-sweep wing portions 16 is mounted by means of a respective main pivot 20. The rearwardly extending supersonic position of the variable-sweep wing portion 16 is illustrated in full lines in FIGURE 1, while the subsonic laterally extending position of the wings is illustrated in broken lines.

The power transmission of the present invention, generally designated 22, is shown to be mounted to the back side of the yoke 18. A single drive shaft 24 extends through the transmission unit 22, with one end of the shaft 24 connecting to an actuator 26 for the left variable-sweep wing portion 16, and the other end of the shaft 24 connecting to a similar actuator (not shown) for the right wing of the aircraft. This actuator 26 is or may be of conventional design, and as shown herein is a screwjack type actuator. Thus, the actuator 26 comprises a base portion 28 pivotally connected to the main yoke 18, a screw member 30 connected to and extending outwardly from the base member 28, and a nut member 32 mounted for travel along the screw member 30 and pivotally connected to the variable-sweep portion 16. Rotation of the main drive shaft 24 acts through the base member 28 of each actuator 26 to rotate each screw member 30 thereof and thus swing the two wing portions 16 either inwardly or outwardly.

Mounted to the housing 33 of the transmission unit 22 are three hydraulic motors 34, 36 and 38, each of which is powered by respective hydraulic lines 40, 42 and 44. For highest reliability, each of these lines 40, 42 and 44 would be connected to a respective separate power subsystem of the airplane. The working components of the transmission unit 22 are illustrated in FIGURE 2. For clarity of illustration, the housing 33 of the transmission unit 22 is not illustrated in FIGURE 2, it being understood that the components illustrated in FIGURE 2 are suitably encased and mounted within the housing 33.

In describing this transmission unit 22, the longitudinal axis of the unit 22 will be considered as coincident with the axis of the main drive shaft 24 of the unit 22; also, the terms "inner" and "outer" will denote proximity to this longitudinal axis; and the term "front" will denote a location closer to the hereinafter described planetary unit of the transmission 22, while the term "rear" will refer to a location further from the planetary unit.

As indicated previously, there are three separate power inputs for this transmission unit 22, and these are given respective designations 46, 48 and 50. Certain components are common to all three input units 46 through 50, and for ease of description these will be given like numerical designations.

Each of the input units 46, 48 and 50 comprises a first drive gear 52 having an interiorly splined portion 54 to receive in driving relationship an output shaft (not shown) of its respective hydraulic motor 34, 36 or 38. Each such drive gear 52 meshes with a lower gear 56, which through a reverse locking clutch 58 rotates a related worm gear member 60. Each drive gear 52 also acts through a related intermediate gear 62 to rotate an upper gear 64, which through an upper reverse locking clutch 66 drives upper worm gear member 68. Each reverse locking clutch 58 or 66, as its name implies, serves the function of an irreversible drive (i.e., transmitting torque from its related gear 56 or 64 to its related worm gear 60 or 68, but preventing any feedback torque from being transmitted from the worm gear 60 and 68 to the drive gear 52). Each set of upper and lower worm gears 60 and 68 engages a respective one of the three main input gears, designated 70, 72 and 74, respectively.

Each of the three main input gears 70, 72 and 74 is secured to a respective one of three input shafts, designated 76, 78 and 80, respectively. These shafts 76, 78 and 80 each have a hollow cylindrical configuration and are arranged concentrically one around the other, with the innermost shaft 76 being mounted around the drive shaft 24 by means of front and rear journal bearings 82 and 84. In like manner, the shaft 78 is mounted about shaft 76 by bearings 86 and 88, and the outermost input shaft 80 is mounted around the shaft 78 by bearings 90 and 92.

At the forward end of the transmission unit 22 is an output assembly, given the general designation 94. This assembly 94 comprises a planetary system 96, having a sun gear 98, three planetary gears 100 meshing therewith, a planetary carrier 102 for said planetary gears, and a ring gear member 104 meshing with and surrounding the planetary gears 100. This planetary system 96 is disposed around and concentric with the longitudinal axis of the main drive shaft 24.

The ring gear member 104 has a rearwardly extending cylindrical portion 106, which serves as a mounting for a pinion bevel gear member 108. This gear 108 is mounted inside of the ring gear member 104 by means of a pin 110 in a manner that the gear 108 is rotatable about an axis radial to the longitudinal axis of the drive shaft 24. Meshing with the pinion bevel gear 108 are two other bevel gears 112 and 114 located respectively immediately to the rear of and forward of the pinion bevel gear 108 and concentric with the shaft 24, which gears 112 and 114 are drive gears for the ring gear member 104.

The forward end of the outermost input shaft 80 is fixedly secured to the rear bevel gear 112; the forward end of the intermediate input shaft 78 extends beyond that of the shaft 80 and is fixedly connected to the forward bevel gear 114; and the forward end of the innermost input shaft 76 extends beyond that of the intermediate input shaft 78 and is fixedly connected to the aforementioned sun gear 98. The drive shaft 24 extends beyond the forward end of the innermost input shaft 76 and is fixedly connected to the planetary carrier 102 which thus functions as the driven or output member of the output assembly 94.

Under usual operating conditions, the three hydraulic motors 34, 36 and 38 each drive a respective one of the three input units 46, 48 and 50, which in turn rotate their respective input shafts 76, 78 and 80. In the particular embodiment illustrated herein, the three main input gears 70, 72 and 74 are the same diameter, and with the three input units 46, 48 and 50 operating at the same speed, the three input shafts 76, 78 and 80 will be driven at the same rotational speed and in the same direction. Thus, the two bevel gears 112 and 114 will rotate together (i.e., in the same direction and at the same rotational speed), so that the bevel pinion gear 108 does not rotate about its axis and the ring gear member 104 rotates at the same speed as the two bevel gears 112 and 114. Likewise, the sun gear 98, being driven by the shaft 76, is also rotating at the same speed and in the same direction as the ring gear 104, so that the planetary gears 100 do not rotate about their respective axes, but cause the planetary carrier 102 and thus the main drive shaft 24 to rotate at the same angular velocity as the three input shafts 76, 78 and 80. Thus, it can be seen that under usual operating conditions (i.e., with all three input units 46, 48 and 50 functioning) the entire output assembly 94, the three input shafts 76, 78 and 80, and the main drive shaft 26 all rotate together, and full torque and full rotational velocity is imparted to the actuators 26 to move the wings 12 of the airplane either forwardly or rearwardly, this depending upon the direction in which the shaft 24 is driven.

If any one of the three hydraulic motors 34, 36 and 38 is not operating (either by choice of the operator or because of some malfunction of the power system delivering fluid to such motor), its related input shaft 76, 78 or 80 is locked in a stationary position by the reverse locking clutches 58 and 66. Let us now consider the various situations in which one or more of the hydraulic motors 34, 36 and 38 are not operating.

First, in the situation where the hydraulic motor 34 is not operating and the input unit 46 is holding the shaft 76 stationary, the sun gear 98 will be locked in place. However, the two input shafts 78 and 80 will rotate and will thus rotate the ring gear member 104 at full rotational velocity. In the particular embodiment shown herein, each of the planetary gears 100 has a diameter one-half that of the sun gear 98, and thus with the sun gear 108 stationary, the planetary carrier 102 will be caused to rotate at two-thirds the rotational velocity of the ring gear 104. Thus, while the velocity of the carrier 102 is reduced, the torque delivered to the carrier 102, and thus to the output shaft 26, is not diminished.

Secondly, assume that in addition to the shaft 76 remaining stationary, the shaft 78 is also locked in place by reason of its respective hydraulic motor 36 and input unit 48 being in a nonoperating condition. In this circumstance, the forward bevel gear 114 will be held stationary, while the rear bevel gear 112 will rotate at full rotational velocity. The effect is that the pinion bevel gear 108 will rotate about its axis and will carry the ring gear 104 at half the rotational velocity of the bevel gear 112. This will, in turn, reduce the rotational velocity of the carrier to one-third of that of the bevel gear 112, but full torque will still be delivered to the carrier 102 and thus to the output shaft 24. In like manner, if the bevel gear 112 remains stationary and the forward bevel gear 114 rotates, the carrier 102 will rotate at one-third speed but will deliver full torque.

Third, assume that the two shafts 78 and 80 are locked in place so that the ring gear 104 is stationary and that the input shaft 76 is rotating the sun gear 98 at full rotational velocity. In this circumstance, the output assembly 94 is functioning as a conventional planetary gear system and the planetary carrier 102 is rotating at one-third the rotational velocity of the sun gear 98, but full torque is still being delivered to this carrier 102.

Fourth, assume that in addition to the sun gear 98 rotating, one of the bevel gears 112 and 114 is rotating, while the other of the bevel gears 112 and 114 remains stationary. In this circumstance, the ring gear 104 is rotating at half the rotational velocity of the sun gear 98, and the carrier 102 will be rotating at two-thirds the velocity of the sun gear 98, with full torque still being delivered to the carrier 102.

In the particular embodiment shown herein, the diameter of the planetary gears 100 is half that of the sun gear 98 so that the velocity component contributed by the sun gear input shaft 76 and the two bevel gear input shafts 78 and 80 are each equal. However, it is to be understood that by modifying this relationship of the diameter of the planetary gears 100 and the sun gear 98, these velocity components can be varied so that more than three resultant velocities can be imparted to the planetary carrier 102. For example, by making the sun gear 98 yet larger and the planetary gears 100 smaller, one velocity for the carrier 102 can be achieved by rotating the sun gear 98 and one of the bevel gears 112 and 114, and yet another velocity for the carrier 102 can be achieved by keeping the sun gear 98 stationary and rotating both bevel gears 112 and 114. Likewise, yet another velocity for the carrier 102 can be achieved by rotating the sun gear in one direction and subtracting one or more of the velocity components contributed by the bevel gears 112 and 114 by rotating one or both of the gears 112 and 114 in a direction opposite to that which the sun gear 98 is rotating.

Additional inputs can be accommodated by providing another planetary system for each additional input. As an example, a fourth input could be used by driving from the carrier 102 to the ring gear of an additional planetary system. The fourth input would drive the second planetary sun gear and the output shaft would be connected to the carrier of the second planetary system. The diameters of the sun and planetary gears are selected such that any one of the inputs will develop the full output torque. The speed of the output shaft is directly proportional to the number of inputs being energized. Thus, this system can be designed for any number of inputs.

I claim:
1. A power transmission comprising:
 (a) a planetary system including:
  (1) a planetary carrier,
  (2) planetary gear means carried by said carrier,
  (3) a ring gear engaging said planetary gear means, and
  (4) a sun gear engaging said planetary gear means,
 (b) power output means operatively connected to said carrier,
 (c) ring gear power input means including:
  (1) first gear means rotatably mounted to said ring gear,
  (2) first and second power inputs to impart, respectively, first and second rotational velocity components to said ring gear, each of said power inputs comprising a respective one of two ring drive gears engaging said first gear means, each of which ring drive gear is mounted for rotation about an axis about which said ring gear rotates, said two ring drive gears being disposed oppositely with respect to said first gear means, whereby with said ring drive gears rotating in the same direction, opposite rotational velocity components are imparted to said first gear means, but with the rotational velocity components imparted to said ring gear being in the same direction, and
 (d) irreversible drive means operatively connected to each of said two ring drive gears, whereby with only one of said two ring drive gears rotating, the other of said ring drive gears is held stationary.

2. The apparatus as recited in claim 1, wherein there is other irreversible drive means operatively connected to said sun gear, whereby with said third power input not operating, said sun gear is held stationary.

3. A power transmission, comprising:
 (a) a planetary system including:
  (1) a planetary carrier,
  (2) planetary gear means carried by said carrier,
  (3) a ring gear engaging said planetary gear means, and
  (4) a sun gear engaging said planetary gear means, and
 (b) power output means operatively connected to said carrier,
 (c) ring gear power input means including:
  (1) a first power input to impart a first rotational velocity component to said ring gear, and
  (2) a second power input to impart a second rotational velocity component to said ring gear,
 (d) said first and second power inputs each comprising a respective one of two ring drive gears which are mounted concentrically with respect to said ring gear,
 (e) a pinion gear rotatably mounted to said ring gear about an axis fixed with respect to said ring gear,
 (f) said two ring drive gears engaging opposite sides of said pinion gear,
 (g) a third power input to rotate said sun gear, whereby each of said first, second and third power inputs operate to contribute a respective rotational velocity component to said carrier, and
 (h) three irreversible drives, each of which is operatively connected to a respective one of said sun gear and said two ring drive gears.

References Cited
UNITED STATES PATENTS

| | | | |
|---|---|---|---|
| 1,754,192 | 4/1930 | Van Vliet | 74—675 X |
| 2,300,424 | 11/1942 | Jones | 74—675 |
| 2,366,646 | 1/1945 | Orr | 74—675 |
| 2,770,149 | 11/1956 | Losey | 74—675 X |
| 3,357,225 | 12/1967 | Grube | 74—675 X |
| 3,358,529 | 12/1967 | Denkieboom | 74—675 |

FOREIGN PATENTS

| | | |
|---|---|---|
| 856,308 | 11/1952 | Germany. |
| 824,763 | 12/1959 | Great Britain. |

DONLEY J. STOCKING, Primary Examiner

T. C. PERRY, Assistant Examiner

U.S. Cl. X.R.

244—46